United States Patent [19]
Füldner et al.

[11] Patent Number: 5,313,440
[45] Date of Patent: May 17, 1994

[54] TRACK CROSSING METHOD USING DUAL COUNTERS

[75] Inventors: Friedrich Füldner; Günter Gleim; Bernd Rekla, all of Villingen-Schwenningen, Fed. Rep. of Germany

[73] Assignee: Deutsche Thomson-Brandt GmbH, Fed. Rep. of Germany

[21] Appl. No.: 871,442

[22] Filed: Apr. 21, 1992

Related U.S. Application Data
[63] Continuation of PCT/EP90/01599, Sep. 20, 1990.

[30] Foreign Application Priority Data
Sep. 30, 1989 [DE] Fed. Rep. of Germany ....... 3932833

[51] Int. Cl.$^5$ ................................................ G11B 7/00
[52] U.S. Cl. ....................................... 369/32; 369/44.28
[58] Field of Search ....................... 369/32, 44.28, 54; 360/78.04, 78.05, 78.06, 78.07, 78.09, 78.11, 75

[56] References Cited
U.S. PATENT DOCUMENTS
3,956,766  5/1976  Hanson et al. ............... 360/78.01
4,484,319  11/1984 Koishi et al. .................. 369/44.28
5,164,646  11/1992 Tawaragi et al. .............. 369/44.28

*Primary Examiner*—Robert J. Pascal
*Assistant Examiner*—Tan Dinh
*Attorney, Agent, or Firm*—Joseph S. Tripoli; Dennis H. Irlbeck; Lester L. Hallacher

[57] ABSTRACT

A system for controlling the number of data tracks crossed by the tracking head of a recording/playback device as the tracking head moves in a desired direction over a recording medium includes a counter having n output terminals. The counter is initially set to a count representative of the desired number of data tracks to be crossed as the tracking head moves in the desired direction. An further counter, also having n output terminals individually corresponding to the output terminals of the counter, is set to a predetermined count. Counting pulses are provided to the counter when the tracking head moves in the desired direction and to the further counter when the tracking head moves in a direction opposite from the desired direction. The output terminals are compared and a stop signal is generated when all terminals of both counters show that both counters are in the same state.

6 Claims, 5 Drawing Sheets

TRACK CROSSING METHOD USING DUAL COUNTERS

This is a continuation of PCT application PCT/EP 90/01599 filed Sep. 20, 1990 by Gunter Gleim, Friedrich Fuldner, and Bernd Rekla and titled "Counter"

BACKGROUND OF THE INVENTION

This invention can be used with the invention described in application Ser. No. 871,444 filed concurrently herewith by Gunter Gleim, Friedrich Fuldner and Bernd Rekla and titled "Detector Circuit", which application is a continuation of PCT application PCT/EP 90/01595, filed Sep. 20, 1990.

This invention can be used with the invention described in application Ser. No. 871,445 filed concurrently herewith by Gunter Gleim, Friedrich Fuldner and Bernd Rekla and titled "Direction-Determination Logic", which application is a continuation of PCT application PCT/EP 90/01594, filed Sep. 20, 1990.

The invention is directed to a method of determining the direction of travel of a scanner across markings or data tracks on a recording medium in which a first error signal and a second error signal shifted in phase from the first error signal is generated. CD players, video disc players, DRAW disc players or magneto-optical recording and playback apparatus, for example, are equipped with a track regulation circuit and an optical scanning device.

The construction and function of an optical scanning device, a so-called optical pick-up, are described in Electronic Components & Applications, Vol. 6, No. 4, 1984, on pages 209 through 215. Lenses focus a light beam emitted from a laser diode onto a compact disk, which reflects it onto a photodetector. The information stored on the disk, and the actual values for the focusing and tracking circuits are obtained from the signal reflected from the detector. The referenced article calls the deviation of the focusing-circuit actual value from its reference value the focusing error, and the deviation of the tracking-circuit actual value from its reference value the radial tracking error.

The focusing circuit is adjusted with a coil having an object lens which moves along an optical axis through the magnetic field of the coil. The focusing circuit moves the lens back and forth to maintain the light beam from the laser diode focused on the compact disk. The tracking circuit, which is often called the radial drive mechanism, moves the optical pickup radially over the disc.. The radial-drive mechanism in some equipment includes a coarse-driven mechanism and a fine-drive mechanism. The coarse-drive mechanism can include a spindle that shifts the overall optical pickup, consisting of a laser diode, lenses, a prismatic beam splitter, and a photodetector, back and forth radially. The fine-drive mechanism can either shift the beam of light back and forth radially or tilt it at a prescribed angle, advancing it slightly, approximately 1 mm, along a radius of the disc.

High quality reproduction, irrespective of whether the data are both picture and sound in a videodisc player, sound alone in a compact-disc player, or the data stored on a magneto-optical disc, requires precise focusing of the light beam onto the disc and also precise guidance along the data tracks of the disc.

FIGS. 1 to 4 are useful in understanding how the track of a laser scanned disc is followed. In FIG. 1, three laser beams L1, L2, and L3 are focused onto a photodetector PD in the optical pickup of a compact-disk player, the direction of motion of detector PO relative to the disc is indicated by the arrow. Beams L2 and L3 are diffraction beams of orders $+1$ and $-1$. A pickup of this type is called a three-beam pickup. The photodetector PD includes four square photodiodes A, B, C and D arrayed in the form of a larger square. A rectangular photodiode E is arranged in front of the diodes A to D and another photodiode F is arranged behind the photodiodes A to D. The middle laser beam, beam 1, is focused onto photodiodes A, B, C, and D, to generate data signal $HF=AS+BS+CS+DS$ and a focusing-error signal $FE=(AS+CS)-(BS+DS)$. The forward outer beam L3 is reflected to photodiode E and rear outer beam L2, is reflected to photodiode F. The two outer beams L2 and L3 provide signals for the generation of a tracking-error signal $TE=ES-FS$. The parameters AS, BS, CS, DS, ES, and FS are the photoelectric voltages provided by the photodiodes A, B, C, D, E, and F, respectively.

When the middle laser beam L1 is precisely at the middle of a track the tracking-error signal TE has the value zero:

$$TE=ES-FS.$$

When the middle beam moves away from the middle of the track S, one of the diffraction beams approaches the middle of the track and the other diffraction beam shines on the space between two tracks. Since, however, a track reflects differently from the space between the two tracks, one diffraction beam will be reflected more powerfully than the other.

Laser beams L1, L2, and L3 are displaced to the right of track S in FIG. 2, and the tracking-error signal assumes a negative value:ps
$$TE=ES-FS<0.$$

The mechanism that adjusts the tracking circuit shifts the optical pickup to the left until tracking-error signal TE becomes zero.

In the opposite situation, when the laser beams have been displaced to the left of the track, the tracking-error signal becomes positive:

$$TE=ES-FS<0.$$

The mechanism that adjusts the tracking circuit shifts the optical pickup to the right until the tracking-error signal becomes zero. This situation is illustrated in FIG. 3.

When middle beam L1 and its associated diffraction beams L2 and L3 cross several data tracks, tracking-error signal TE assumes the sinusoidal shape illustrated in FIG. 4.

A tracking circuit is described in Japanese Exposure 60 10429. In this tracking circuit, the lower and upper envelope of the HF signal indicates whether a beam of light is crossing any data tracks. When the beam travels over several tracks, the HF signal collapses uniformly between two tracks. The number of tracks crossed by the beam of light is determined by constructing, the envelope of the HF signal and converting the envelope into a square-wave signal that is supplied to the counting input terminal of an up-and-down counting circuit, which counts the HF breakdowns.

Direction determining logic is used to determine the direction of the radial motion of the light beam across the recording medium. This logic evaluates the phase shift between the tracking error signal TE and the envelope of the HF signal.

Patent GB-A 2 073 543 describes a tracking regulation circuit which checks whether the HF signal lies below a predetermined threshold value. When it does, dependent upon the sign of the preceding tracking error signal, either a positive or a negative voltage is applied to the control unit of the optical scanner to guide the scanner onto the right data track. However, because dust, dirt, fingerprints or scratches on a CD disk can also cause a collapse of the HF signal, measures must be taken to distinguish between HF collapses caused by such conditions of the recording medium from HF collapses caused by tracking changes of the light beam.

Patent EP-A 0 183 303 describes a CD player in which the lock-in of the light spot onto a data track of the compact disk, the so-called locking-in, occurs at the point of the largest eccentricity of the disk because at this point the relative speed between the light beam and the data track is the lowest. In order to determine the number of tracks crossed by the light beam the envelope of the HF signal is generated and compared with a threshold value. The comparison of the envelope of the HF signal with the first threshold value provides a pulse shaped signal. Each pulse of this pulse shaped signal indicates a change of track. In order to render the CD player more secure against so-called drop-outs—i.e. audible interference in sound reproduction due to a defective, scratched or dirty compact disk—the envelope of the HF signal can be compared with a second threshold value. A pulse is generated from the envelope of the HF signal only when the envelope exceeds both the first and the second threshold value and when the drop-out detector of the CD player is not in operation.

Patent WO-A-88/09988, describes a CD player with a drop-out detector which evaluates the HF signal. This tracking regulation circuit is disadvantageous in that upon a reversal in the direction of the light beam the phases of the HF signal which generates the counting pulses and the tracking error signal must be taken into consideration because errors can be caused by improper phasing.

SUMMARY OF THE INVENTION

It is an object of the invention to reduce the error rate in a method for counting markings or data tracks. The invention achieves this objective in that a first counter receives a counting pulse when the scanner moves from one data track to the next in the desired direction. A second counter receives a counting pulse when the scanner moves from one data track to the next in the undesired direction. For the purpose of crossing m markings the first counter is set to a first predetermined count and the second counter is set to a second predetermined count. The two counters are compared and when they are equal a signal which stops the scanner is generated.

DETAILED DESCRIPTION

Figure 1:
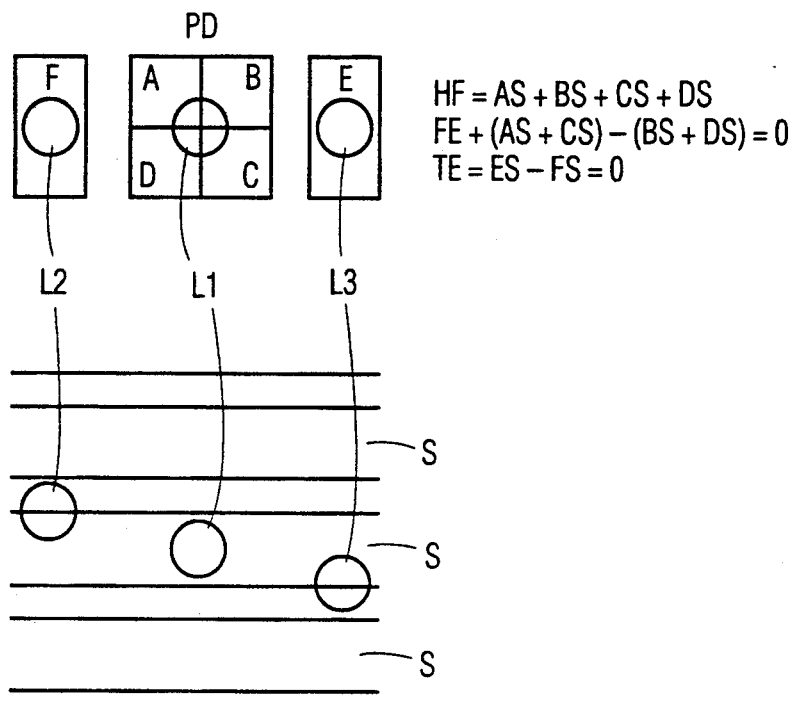
FIGS. 1 TO 4 show how a laser beam tracks a record groove.
Figure 2:
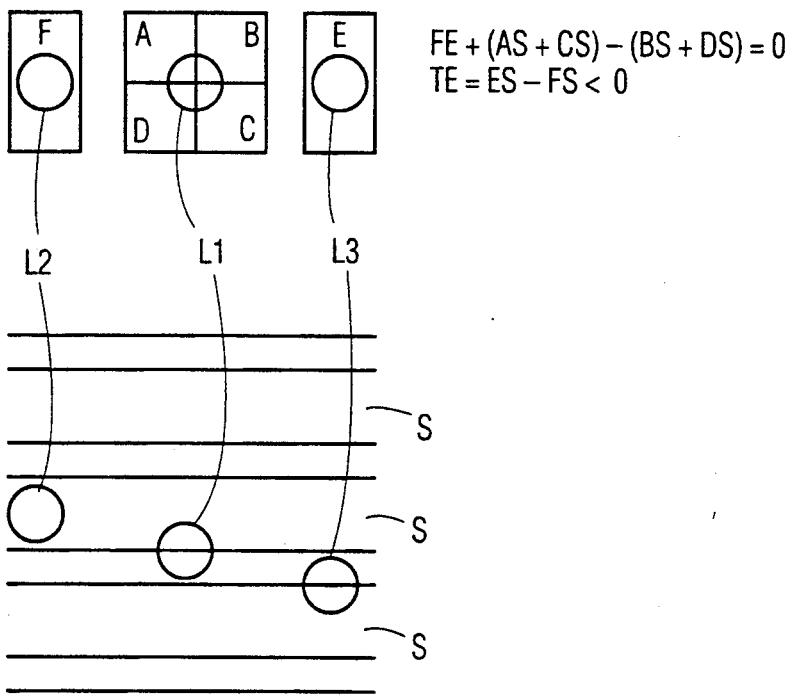
Figure 3:
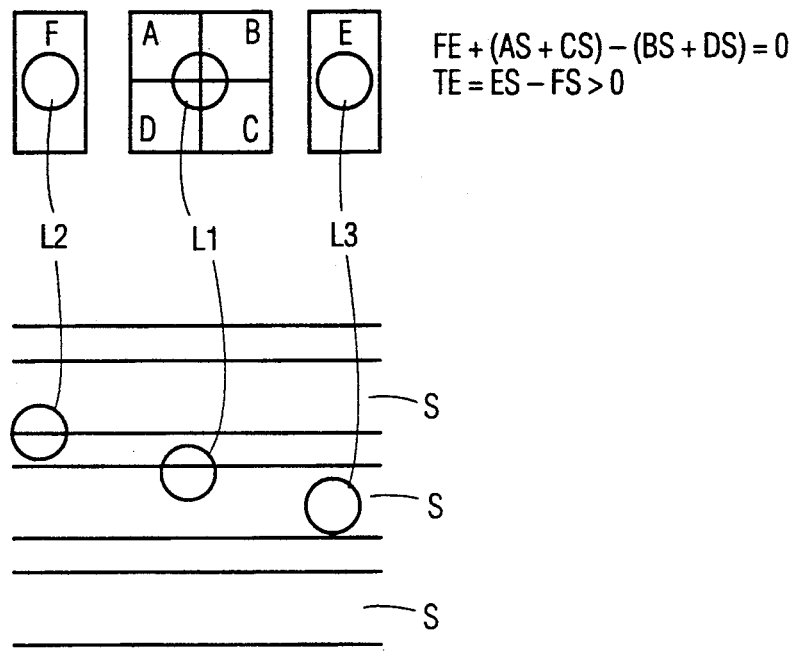
Figure 4:
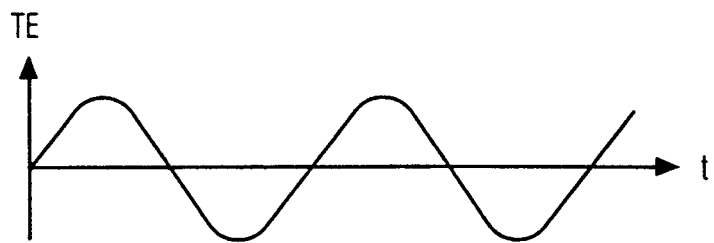
Figure 5:
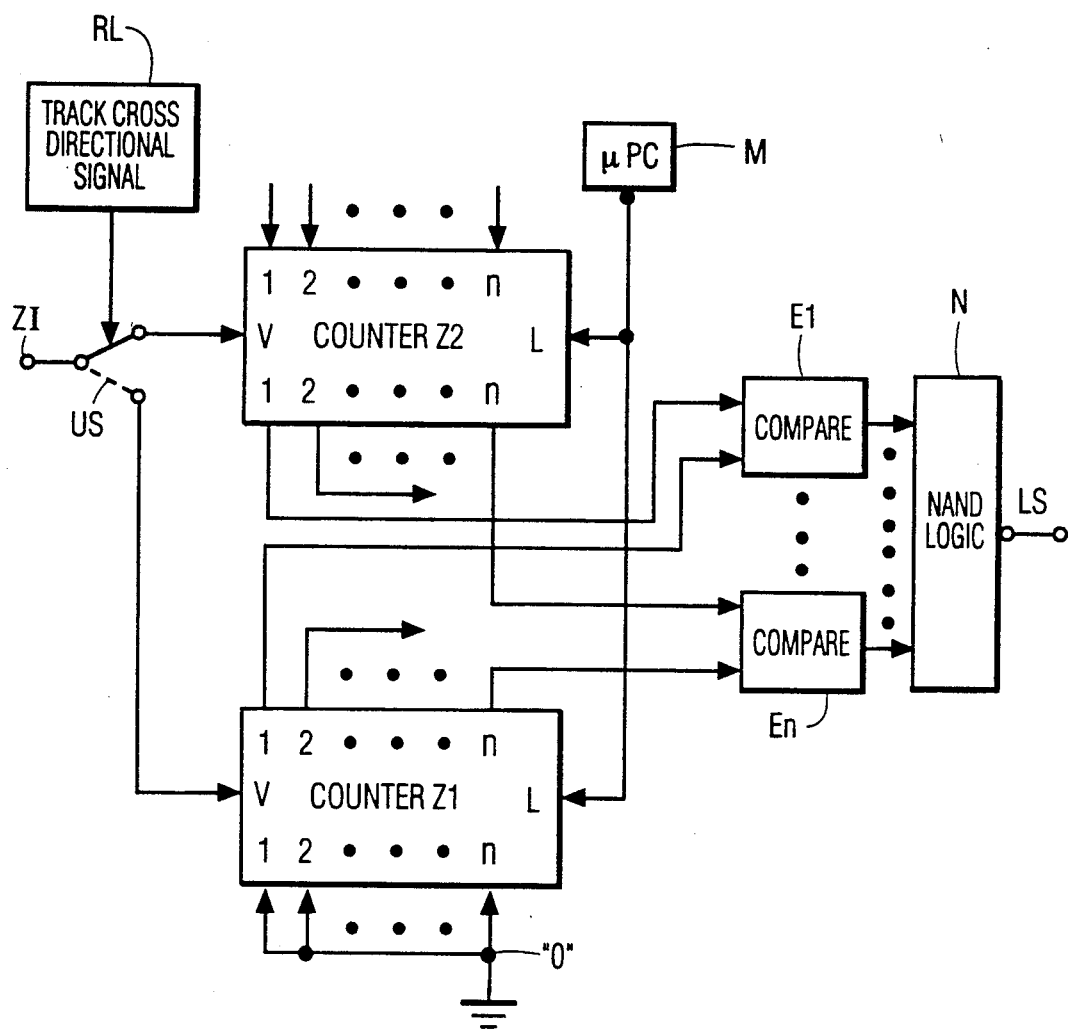
FIG. 5 is a preferred embodiment.

In FIG. 5, a selector switch US is controlled by a directional logic circuit RL, which can be the type described in application Ser. No. 871,445 fully referenced hereinabove. Selector switch US provides counting pulses ZI to the counting input terminal V of an n-bit first counter Z1 when a detecting device, which is supported on a tracking head, crosses tracks in the desired direction, typically radially toward the center of a disc. The counting pulses can be obtained from the envelope of an HF signal when the beam crosses tracks when traveling in the other direction, radially toward the edge of the disc, i.e. due to vibration or impact, switch US diverts the counting pulses ZI to the counting input terminal V of an n-bit second counter Z2. The output terminals of counters Z1 and Z2 are connected to a chain of n comparators E1-En such that corresponding output terminals of counters Z1 and Z2 are connected to the two input terminals of each comparator. The comparators E1-En provide a logic ONE output pulse unless all input terminals are at the same level. The output terminals of comparators E1-En are connected to the input terminals of a NAND gate N. When the tracking head is intended to radially cross 200 tracks for example, counter Z2 is set at 200 and counter Z1 is set to zero. A microprocessor M provides pulses to the charging input terminals L of counters Z1 and Z2. When the counting input terminal V of counter Z1 receives counting pulses ZI from switch US, it counts up from zero. Counter Z2, however, remains at 200 because it does not receive any counting pulses. The bits at the output terminals of counters Z1 and Z2 are compared in the n comparators E1-En. When all the bits at the output terminals of counters Z1 and Z2 are identical, which occurs when both counters are in the same state, all the comparators E1-En provide a logic zero on their output terminals, NAND gate N provides a logic one on its output terminal, indicating that the tracking head has crossed 200 tracks, and stops the tracking head at the desired track.

In some systems it may be preferable to set the second counter Z2 to a count lower than the number one of m tracks to be crossed. If because of inertia, it takes ten tracks to completely stop the motion of the tracking head counter Z2 is set to m-10. Braking then occurs ten tracks before the target track, and the tracking head drifts to a halt at the desired track. The value to which the counter Z2 is to be set depends on the type of optical pickup and control circuit and can be determined empirically.

The tracking head can skip and cross tracks in the wrong direction during tracking as the result of vibration on being bumped. Compact-disk players installed in motor vehicles are subject to such motions. Assume that the tracking head skips ten tracks in the wrong direction as the result of hitting a pothole after it has already tracked 50 tracks in the right direction. Since directional logic circuit RL recognizes the change in the beam's direction, it activates switch US, and counter Z2 receives ten pulses. Its state is then increased to 210. When the effect of the impact is over, which takes ten tracks in the present example, the beam resumes tracking in the correct direction. Directional logic circuit RL reverses switch US, diverting counting pulses ZI back to counter Z1. Since counter Z2 is now set at 210 instead of 200, the signal to stop the tracking head is not output until counter Z1 has counted up to 210. This approach ensures that the tracking head will not stop tracking until it arrives at the desired track, instead of ten tracks in front of it, as it would have had counter Z2 not been increased.

Figure 6:
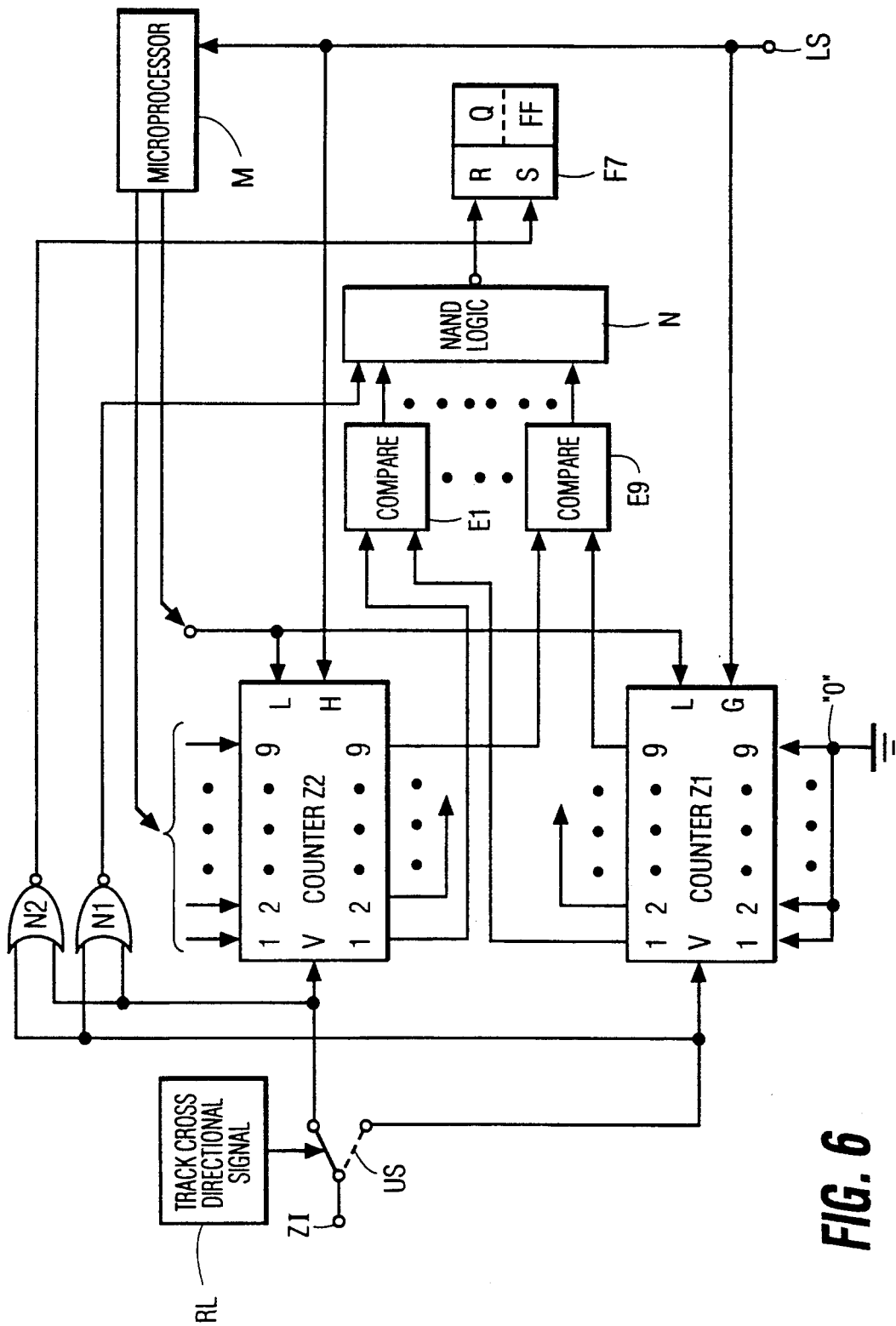
FIG. 6 is another preferred embodiment.

Compact-disc players can cross 1000 or more tracks to find a particular passage to play, the expense of the counters and comparators is very high and rises rapidly. Skipping 1000 tracks requires two 10-bit counters and ten comparators. The embodiment shown in FIG. 6 allows as many tracks as desired to be skipped using two 9-bit counters. It has been supplemented, as described in hereinbelow, with a delay stage and a flip-flop.

The output terminal of NAND gate N is connected to the reset input terminal R of an RS flip-flop FF. The Q output terminal of flipflop F7 provides the signal LS that stops the tracking to the reset input terminal G of nine bit counter Z1 and to the set input terminal H of nine bit counter Z2. The counting input terminal V of counter Z1 is connected to the first input terminal of two NOR gates N1 and N2. The counting input terminal V of counter Z2 is connected to the second input terminal of NOR gates N1 and N2. The output terminal of NOR gate N1 is connected to one input terminal of NAND gate N. The output terminal of NOR gate N2 is connected to the set input terminal S of RS flip-flop FF.

Assume it is desirable to cause the tracking head to move from a current position, (the beginning of the first passage on a compact disc for example) to the third passage which the operator wants to listen to. A microprocessor M in the player calculates how many tracks there are between the tracking head current position and the beginning of the desired passage, 700 in the present example. Since 700=2·256+188, a 9-bit counter must count to 256 twice and to 188 once. Counter Z2 is accordingly set to 188 and counter Z1 set to zero, and counter Z1 begins counting. 188 counting pulses later counters Z1 and Z2 will be at the same state for the first time, and RS flip-flop F7 is reset. The negative pulse at its Q output terminal sets the ninth bit in counter Z2 at 1 and the ninth bit in counter Z1 at 0. Counter Z1 continues counting until, 256 pulses later, it is at the same state as counter Z2 and RS flip-flop 7 emits a negative pulse from its Q output terminal. The ninth bit is set to 1 in counter Z2 and to 0 in counter Z1. Since counters Z1 and Z2 will be at the identical stage again 256 pulses later, RS flip-flop 7 emits a negative pulse from its Q output terminal for the third time. The microprocessor determines from this negative pulses that 188 has been counted once and 256 twice, for a total of 700 pulses.

When the tracking head skips in the wrong direction as the result of impact while crossing the 700 tracks, the count of counter Z2 is increased exactly as in the FIG. 5 embodiment because the tracking head can skip several times in the wrong direction when crossing a large number of tracks when the road is bumpy. To prevent incorrect interpretation of the counter states in such conditions, the highest-place bit is set to 0 in counter Z1 and to 1 in counter Z2 when the states are equal for the first time when 188 pulses are counted. Counter Z1 continues to count until the tracking head begins to cross tracks in the right direction. However, when 12 counts later counter Z1 is at a state of 200, and the tracking head has been displaced 20 tracks in the wrong direction as the result of vibration, counter Z2 will count from 188 to 188+20=208. The counter states would be identical at the count of 200, and, if the highest-place bit counter Z1 had not been set a 0 and that in counter Z2 at 1 when both counters were at 188. Without this measure a pulse indicating that the desired count has been reached would be released to the microprocessor. Since the beam of light resumes crossing the tracks in the correct direction after the vibration ceases, counter Z1 counts up from 200. However, because of the vibration, the state of counter Z2 is 208 instead of 188 and equivalent states would be detected for the third time, with counter Z1 at a state of 208, although the tracking head had crossed a total of only 200 tracks in the correct direction, if the highest-place bit in counter Z1 had not been set at 0 and that in counter Z2 at 1 when the counters were at 188.

Figure 7:
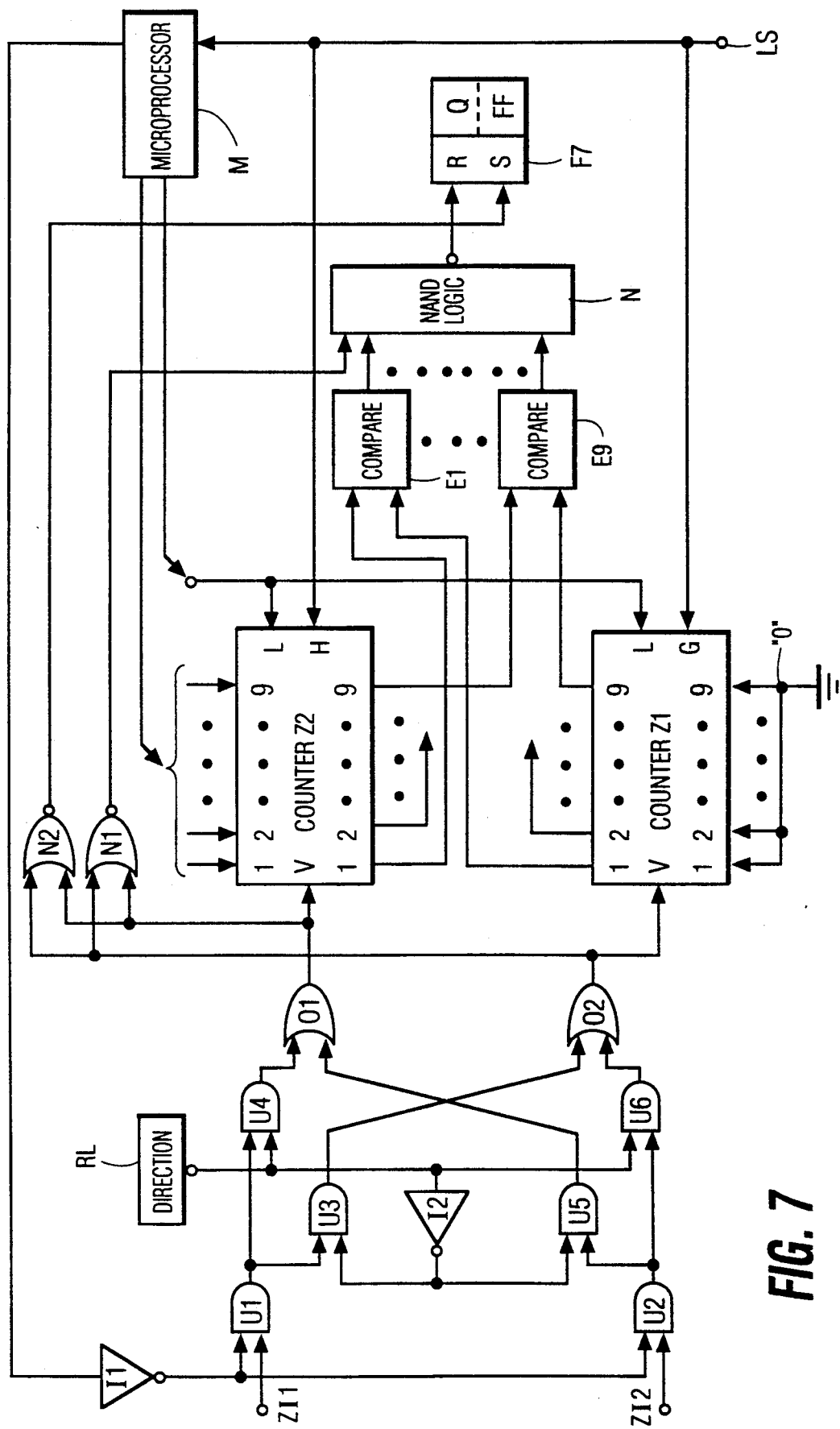
FIG. 7 is a third preferred embodiment.

Switch US can, as illustrated in FIG. 7, be expanded to allow counting pulses Z1 to be forwarded to counter Z1 or Z2 in accordance with the desired and actual direction of the beam of light. In FIG. 7, counting pulses ZI1 are forwarded to the first input terminal of an AND gate U1 when the tracking head moves toward the center of the disc. Counting pulses Z12 are forwarded to the first input terminal of another AND gate U2 when the beam is away from the center of the disc. The second input terminals of AND gates U1 and U2 are connected together and to the output terminal of an invertor I1. The output terminal of AND gate U1 is connected to the first input terminal of two AND gates U3 and U4. The output terminal of AND gate U2 is connected to the first input terminal of two AND gates U5 and U6. The input terminal of an invertor I1 is connected to the second input terminal of AND gates U4 and U6 and its output terminal is connected to the second input terminal of AND gates U3 and U5. The first input terminal of an OR gate 01 is connected to the output terminal of AND gate U4, its second input terminal to the output terminal of AND gate U5, and its output terminal to the counting input terminal V of counter Z2. The first input terminal of an OR gate 02 is connected to the output terminal of AND gate U3, its second input terminal to the output terminal of AND gate U6, and its output terminal to the counting input terminal V of counter Z1.

Since the logic one at the input terminal inverter I1 inhibits all AND gates U1 through U6, the counters are also inhibited. A logic zero at the input terminal of inverter I1 uninhibits AND gates U1 and U2 and counting pulses can be passed. A logic one at the input terminal of inverter I2 is also applied to the second input terminals of AND gates U4 and U6 and counting pulses arriving at the first input terminal of AND gate U1 are forwarded to counter Z2 and the counting pulses Z1 arriving at the first input terminal of AND gate U2 are forwarded to counter Z1. When there is a logic zero at the input terminal of inverter I2, the connections for the counting pulses are reversed. ZI1pulses at the first input terminal of AND gate U1 are then forwarded to counter Z1 and the Z12 pulses at the first input terminal of AND gate U12 are forwarded to counter Z2. When the desired crossing direction is inward, there is a logic one at the input terminal of the invertor I2 in the FIG. 7 embodiment whereas a logic zero at that point indicates that the desired direction is outward.

The invention is generally appropriate for counting circuits for counting indications, whether or not the indications or tracks are sensed mechanically or remotely. The invention can be employed to advantage in circuits that position a component, a pickup for example, by optically sensing and counting indications. It is particularly appropriate for tracking circuits like those typical of compact-disc players, videodisc players, DRAW-disc players, and magneto-optical recording and playback equipment.

We claim:

1. A method of controlling the tracking head in a recording/playback device to cause said tracking head to cross a selected number of data tracks in a data medium when traveling in a desired direction comprising the steps of:

establishing a first count value representative of said selected number and incrementing/(decrementing) said count value each time said tracking head crosses a data track when traveling in a direction opposite said desired direction;

establishing a second count value which is different from said first count value by an amount equal to said selected number and incrementing/(decrementing) said second count value each time said tracking head crosses a data track when traveling in said desired direction;

comparing the incremented/(decremented) first and second count values and providing a control signal to said tracking head when said incremented/(decremented) first and second count values are equal.

2. A method of controlling the tracking head in a recording/playback device to cause said tracking head to cross a selected number of data tracks in a data medium when traveling in a desired direction comprising the steps of:

factoring said selected number into components $X2^k + R$ where X, k and R are integers and R is the remainder of the selected number minus $X2^k$, and establishing first and second count values having a difference R;

incrementing/(decrementing) said first count value each time said tracking head crosses a data track when traveling in a direction opposite said desired direction;

incrementing/(decrementing) said second count value each time said tracking head crosses a data track when traveling in said desired direction;

comparing the incremented/(decremented) first and second count values and providing a control signal when said incremented/(decremented) first and second count values are equal;

monitoring said control signal for determining the occurrence of R track crossings in the desired direction;

successively establishing said first and second count values with a difference $2^k$, each time the control signal indicates that $2^k$ track crossings have occurred in the desired direction; and counting the number of occurrences that the control signal indicates that $2^k$ track crossings in the desired direction have occurred and providing a stop signal to said tracking head after X indications of said $2^k$ track crossings.

3. A method of controlling the tracking head in a recording/playback device to cause said tracking head to cross a selected number of data tracks in a data medium when traveling in a desired direction comprising the steps of:

establishing a first count value representative of said selected number to a value equal to the selected number of data tracks to be crossed minus M where M is an integer representative of the number of data tracks over which said tracking head will drift due to inertia;

incrementing/(decrementing) said first count value each time said tracking head crosses a data track when traveling in a direction opposite said desired direction;

establishing a second count value which is different from said first count value by an amount equal to said selected number and incrementing/(decrementing) said second count value each time said tracking head crosses a data track when traveling in said desired direction;

comparing the incremented/(decremented) first and second count values and providing a control signal to said tracking head when said incremented/(decremented) first and second count values are equal.

4. Apparatus for controlling the number of data tracks crossed by a tracking head of a recording/playback device as said tracking head moves in a desired direction over a recording medium, comprising:

a source of track crossing pulses indicating the occurrence of respective track crossings;

a source of a control signal which indicates the direction of said respective track crossings;

first and second counters having respective output ports for providing count values, and having respective input terminals for applying counting signals, said first and second counters incrementing/decrementing their respective count values responsive to pulses applied to their respective input terminals;

means for presetting the first and second count values of said first and second counters such that they exhibit a difference corresponding to said number of data tracks;

means responsive to said control signal for applying track crossing pulses to said first counter when said control signal indicates track crossings correspond to a first direction, and for applying track crossing pulses to said second counter when said control signal indicates track crossings correspond to a second direction, and comparator means coupled to the output terminals of said first and second counters, for providing a signal indicating equality of the count values provided by said first and second counters.

5. Apparatus for controlling the number of data tracks crossed by a tracking head of a recording/playback device as said tracking head moves in a desired direction over a recording medium, comprising:

a source of track crossing pulses indicating the occurrence of respective track crossings;

a source of a control signal which indicates the direction of said respective track crossings;

first and second counters having respective output ports for providing count values, and having respective input terminals for applying counting signals, said first and second counters incrementing/decrementing their respective count values responsive to pulses applied to their respective input terminals;

means responsive to said number of tracks for factoring said number to generate the integers X and R corresponding to the values in the relation given by $$\text{number} = X2^k + R$$

where k is an integer and $2^k$ is a value less than the maximum count value that can be provided by said first and second counters;

means for presetting the count values of said first and second counters to a difference equal to R.

means responsive to said control signal for applying track crossing pulses to said first counter when said control signal indicates track crossings correspond to a first direction, and for applying track crossing pulses to said second counter when said control signal indicates track crossings correspond to a second direction;

comparator means coupled to the output terminals of said first and second counters, for providing a signal indicating equality of the count values provided by said first and second counters; and means for resetting the count values of said first and second counters to a difference of $2^k$ on the occurrence of said comparator means indicating said equality.

6. The apparatus set forth in claim 5 wherein said means for resetting further includes:

means for resetting said count values to a difference of $2^k$ each time said comparator means indicates an equality representative of $2^k$ track crossings, and for generating a track crossing stop signal when said comparator means indicates X equalities representative of said $2^k$ track crossings.

* * * * *